United States Patent
Foos et al.

(10) Patent No.: US 9,500,116 B2
(45) Date of Patent: Nov. 22, 2016

(54) GROMMET SEAL, CENTER DIVERSION SHAFT AND METHODS OF MAKING AND USING THE SAME

(71) Applicant: GM Global Technology Operations LLC, Detroit, MI (US)

(72) Inventors: Michael S. Foos, Clarkston, MI (US); Harry E. Eustice, Troy, MI (US); Joseph A. MacDonald, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 660 days.

(21) Appl. No.: 13/896,933

(22) Filed: May 17, 2013

(65) Prior Publication Data

US 2014/0338616 A1 Nov. 20, 2014

(51) Int. Cl.
| | |
|---|---|
| *F01P 11/02* | (2006.01) |
| *F16L 55/11* | (2006.01) |
| *F16L 5/10* | (2006.01) |
| *B60H 1/00* | (2006.01) |
| *B60R 16/02* | (2006.01) |

(52) U.S. Cl.
CPC ....... *F01P 11/0276* (2013.01); *B60H 1/00571* (2013.01); *F16L 5/10* (2013.01); *F16L 55/1141* (2013.01); *B60R 16/0222* (2013.01)

(58) Field of Classification Search
USPC .............................. 277/313, 314; 174/153 G
See application file for complete search history.

(56) References Cited

U.S. PATENT DOCUMENTS

| | | | | |
|---|---|---|---|---|
| 5,732,440 | A * | 3/1998 | Wright | .................. H02G 3/083 16/2.2 |
| 6,353,185 | B1 * | 3/2002 | Sakata | ..................... H02G 3/18 16/2.1 |
| 2008/0185061 | A1 | 8/2008 | Fisk et al. | |
| 2009/0001716 | A1 | 1/2009 | Ehrmann | |

FOREIGN PATENT DOCUMENTS

| | | |
|---|---|---|
| CN | 2934781 Y | 8/2007 |
| CN | 201028137 Y | 2/2008 |
| CN | 202371165 U | 8/2012 |
| CN | 102996906 A | 3/2013 |
| JP | 2012246970 A | 12/2012 |

OTHER PUBLICATIONS

Chinese Office Action dated Dec. 14, 2015; Application No. 201410207426.4 ; Applicant: GM Global Technology Operations LLC.; 7 pages.

* cited by examiner

*Primary Examiner* — Hung Q Nguyen

(74) *Attorney, Agent, or Firm* — BrooksGroup

(57) ABSTRACT

A number of variations may include a drain grommet including a primary and secondary seal and a diversion shaft.

18 Claims, 3 Drawing Sheets

GROMMET SEAL, CENTER DIVERSION SHAFT AND METHODS OF MAKING AND USING THE SAME

TECHNICAL FIELD

The field to which the disclosure generally relates to includes drain grommets.

BACKGROUND

A vehicle may have one or drain grommets.

SUMMARY OF ILLUSTRATIVE VARIATIONS

One variation may include a center diversion shaft for a drain grommet.

Another variation may include a grommet seal having a primary and secondary seal for a drain grommet.

A number of variations may include a drain grommet including a primary and secondary seal and a diversion shaft.

Other illustrative variations within the scope of the invention will become apparent from the detailed description provided hereinafter. It should be understood that the detailed description and specific examples, while disclosing variations, are intended for purposes of illustration only and are not intended to limit the scope of the invention.

BRIEF DESCRIPTION OF THE DRAWINGS

Select examples of variations will become more fully understood from the detailed description and the accompanying drawings, wherein.

DETAILED DESCRIPTION OF ILLUSTRATIVE VARIATIONS

The following description of the variations within the scope of the invention is merely illustrative in nature and is in no way intended to limit the scope of the invention, its application, or uses.

Figure 1:
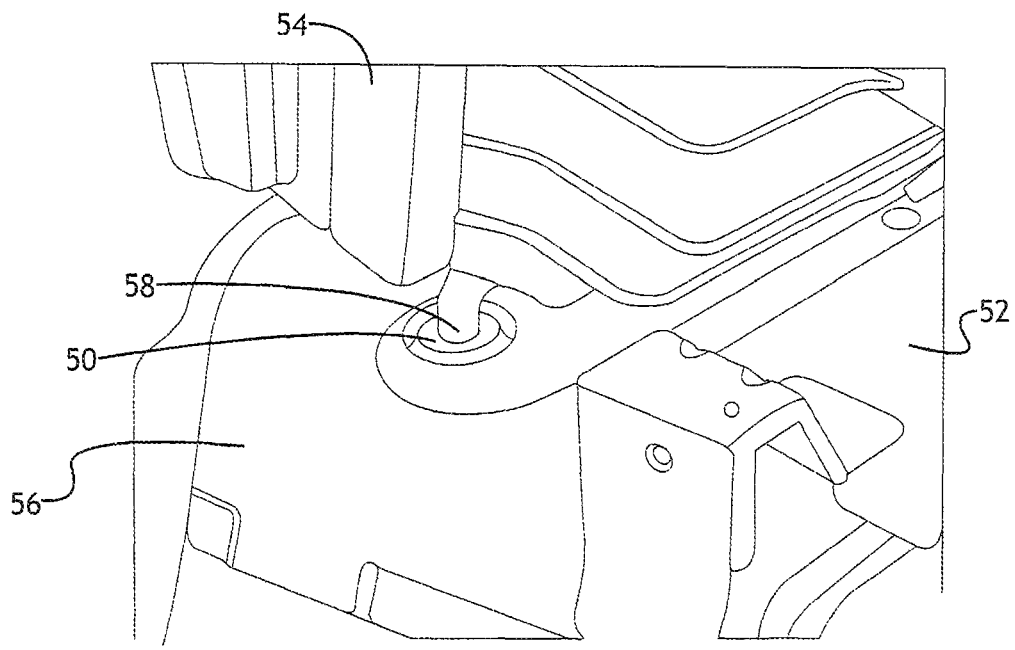
FIG. 1 depicts a drain grommet attached to a vehicle heating, ventilation, and air conditioning system and installed into a vehicle body according to a number of variations.
Figure 2:
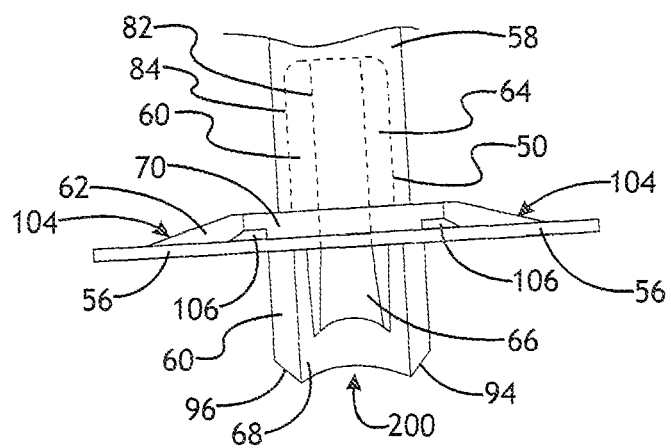
FIG. 2 depicts a sectional view of a drain grommet attached to a hose end and installed into the vehicle body according to a number of variations.

One or more drain grommets 50 may be used in any of a number of applications, including, but not limited to use in vehicle 52 heating, ventilation, and air conditioning system 54. A drain grommet 50 may be attached to a vehicle panel such as a panel of the vehicle heating, ventilation, and air conditioning system 54 via a hose end 58, for example as illustrated in FIGS. 1-2. The drain grommet 50 may then be attached to the vehicle body 56, for example as illustrated in FIGS. 1-2.

Figure 3:
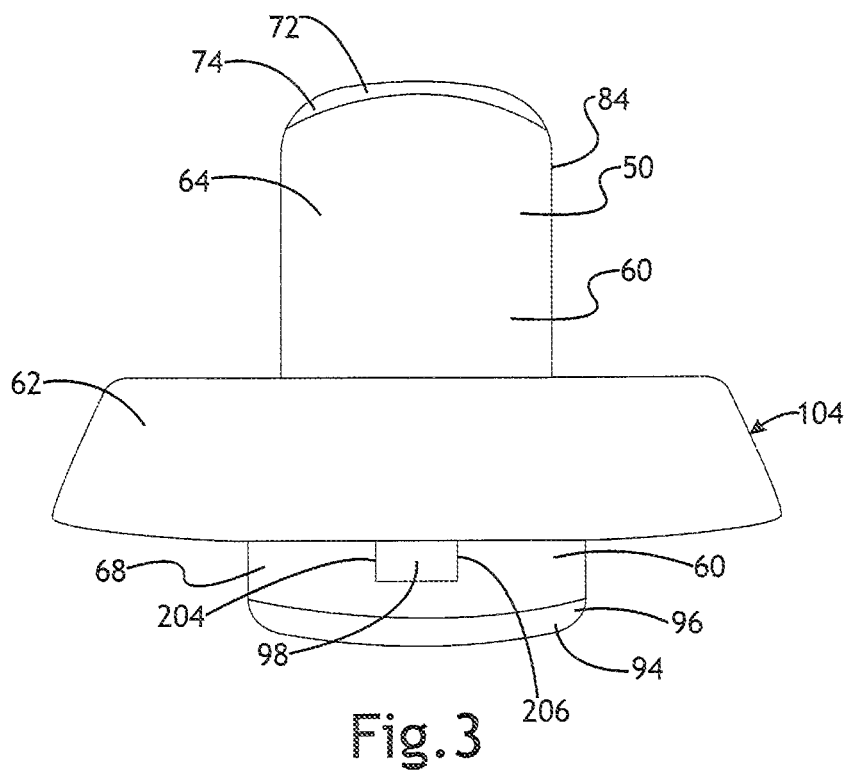
FIG. 3 depicts a drain grommet according to a number of variations.
Figure 4:
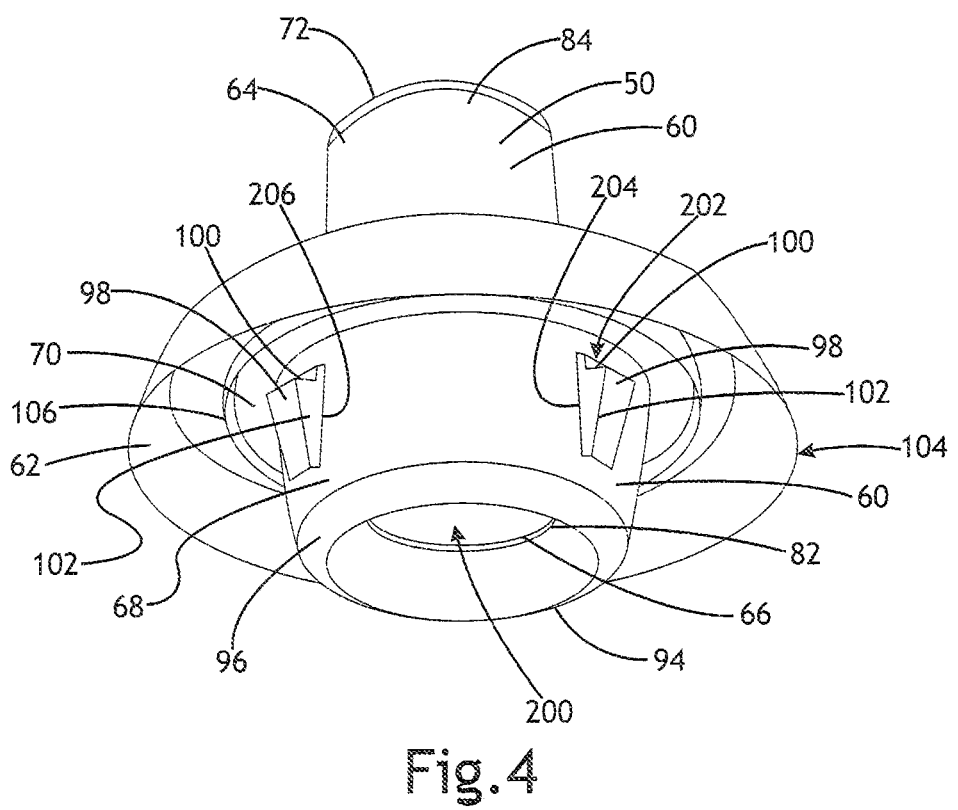
FIG. 4 depicts a drain grommet according to a number of variations.

Referring to FIGS. 3-6, a drain grommet 50 may include a body 60 and a seal 62 which may extend radially from the body 60 for example as shown in FIGS. 3 and 4. The body 60 of the drain grommet 50 may include a passage 200 formed there through. In a number of variations, the body 60 may include at least one of first cylindrical or tubular portion 64, a second cylindrical or tubular portion 66, or a third cylindrical or tubular portion 68. The body 60 may also include a lip 70. The body 60 may include any of a number of materials including, but not limited to, synthetic or natural polymers, such as nylon. In a number of variations, the body 60 may be molded from a polymeric material.

Referring to FIGS. 2-6, the first cylindrical or tubular portion 64 may have any of a number of diameters in order to be able to accept any of a number of hose ends 58 which may be attached to a heating, ventilation, and air conditioning assembly 54, for example as illustrated in FIG. 1. The outer surface 84 of the first cylindrical or tubular portion 64 may be tapered inward 74 adjacent the perimeter which may assist with assembly into a hose end 58, for example as illustrated in FIGS. 2-3 and 5-6.

Figure 5:
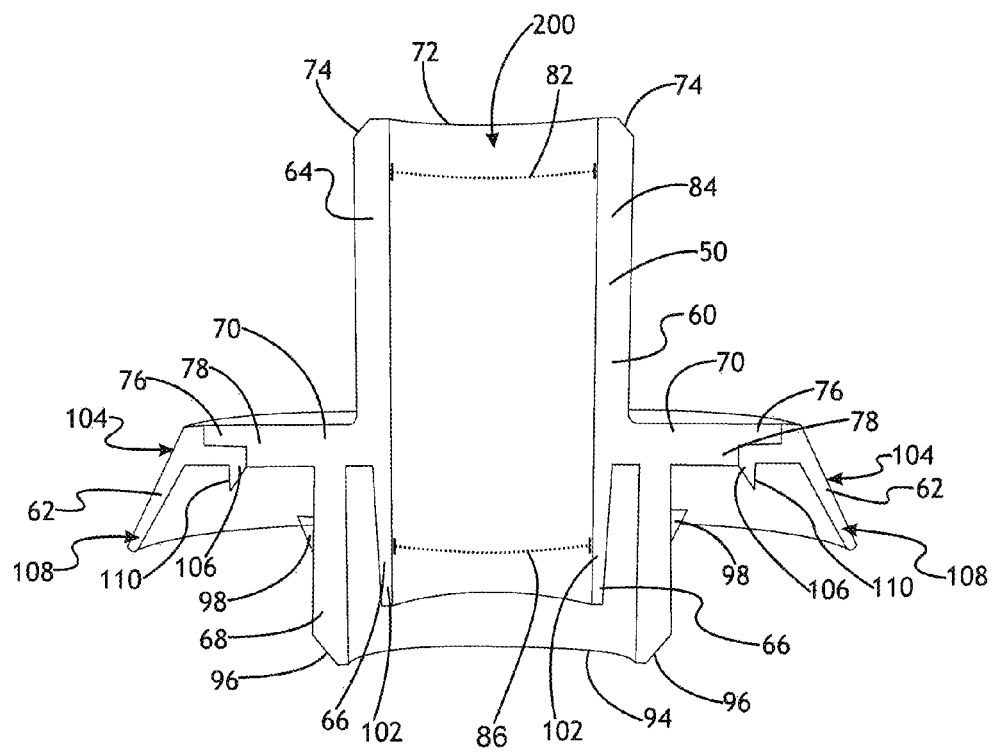
FIG. 5 depicts a drain grommet according to a number of variations.
Figure 6:
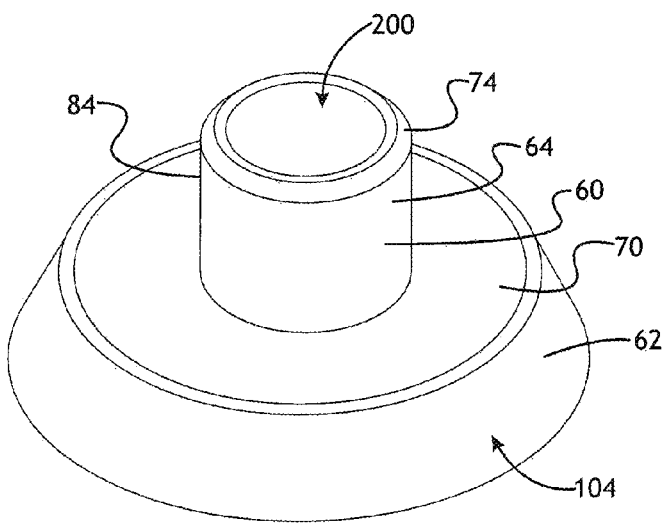
FIG. 6 depicts a drain grommet according to a number of variations.

The first cylindrical or tubular portion 64 may extend a distance from a planar lip 70 which may extend radially from the drain grommet body 60, for example as illustrated in FIGS. 3 and 5-6. The lip 70 may vary in thickness as it extends radially around the grommet body 60, such that it may include an upper planar portion 76 and a lower planar portion 78. The upper planar portion 76 of the lip 70 may extend a distance further than the lower planar portion 78 of the lip 70, for example as illustrated in FIG. 5. The upper planar portion 76 of the lip 70 extending further than the lower planar portion 78 of the lip 70 may form an angle, including, but not limited to a 90 degree angle, between the two planar portions 76, 78 of the lip 70, for example as illustrated in FIG. 5.

A second cylindrical or tubular portion 66 may extend downward from the lip 70 and may include an inner diameter 86 which is the same diameter as the inner diameter 82 of the first cylindrical or tubular portion 64. The thickness (or outer surface) of the second cylindrical or tubular portion 66 may taper as the second cylindrical or tubular portion 66 extends downward, for example as illustrated in FIG. 5. The second cylindrical or tubular portion 66 may be configured to act as a diversion shaft to prevent water from migrating back through the slots 202, 204, 206 that form or define in part the locking feature 98.

A third cylindrical or tubular portion 68 may extend downward from the lower planar portion 78 of the lip 70, and may be spaced a distance from the first and second cylindrical or tubular portions 64, 66, for example as illustrated in FIG. 5. The third cylindrical or tubular portion 68 may also extend a distance longer than the length of the second cylindrical or tubular portion 66. The inner diameter 92 of the third cylindrical or tubular portion 68 may be larger than the inner diameters 82, 86 of the first and second cylindrical or tubular portions 64, 66. The outer diameter 94 of the third cylindrical or tubular portion 68 may be any of a number of diameters to mate with an opening in a vehicle body 112. The outer diameter 94 of the third cylindrical or tubular portion 68 may be tapered inwards adjacent the perimeter which may assist with installation into a vehicle body 56. The third cylindrical or tubular portion 68 may also include at least one locking feature 98, for example a cantilevered ramped nub or finger, as illustrated in FIGS. 3-5. The locking feature 98 may have a top portion 100 which may extend a distance outward from the third cylindrical or tubular portion 68 and gradually taper as it extends downwards along the third cylindrical or tubular portion 68. The top portion 100 of the locking feature 98 may be planar. The at least one locking feature 98 may retain the drain grommet 50 in the vehicle body 56 after installation.

A seal 62 may be attached to the drain grommet body 60, for example as illustrated in FIGS. 3-5. The seal 62 may comprise any of a number of materials, including, but not limited to an elastomeric material such as rubber. The seal 62 may be secured to the drain grommet body 60 in any of a number of variations including, but not limited to, overmolding with a second shot of material. That is, the seal 62 may be overmolded to the body 60, for example, overmolded to the lip 70. The seal 62 may be configured to radially attach to the underside 72 of the upper planar portion 76 of the lip 70. The seal 62 may include a primary sealing feature 106 and a secondary sealing feature 104. The primary sealing feature 106 may be located radially along the surface forming the angle between the upper planar portion 76 of the lip 70 and the lower planar portion 78 of the lip 70, for example as illustrated in FIG. 5. The primary sealing feature 106 may extend downwards at an angle towards the secondary sealing feature 104. The outer side 110 of the primary sealing feature 106 may be vertically planar. The seal 62 may also include a secondary sealing feature 104 which may extend radially downward and outwards, for example as shown in FIGS. 3-5. The secondary sealing feature 104 may have a tapered portion 108 as it extends downward, for example as shown in FIG. 5. Referring to FIG. 2, the seal 62 may be configured to prevent leakage into the cabin of the vehicle 52. The first cylindrical or tubular portion 64 of the drain grommet 50 may be installed into the hose end 58 so that the perimeter of the hose end 58 is flush with the lip 70 of the drain grommet 50. The third cylindrical or tubular portion 68 may then be installed into an opening 112 in the vehicle body 56 so that the lower planar portion 78 of the drain grommet 50 is flush with the vehicle body 56. The primary sealing feature 106 may also become flush with the vehicle body 56 which may protect the cabin of the vehicle 52 from fluid. The secondary sealing feature 104 may also become flush with the vehicle body 56 once the drain grommet is installed into the vehicle body 56. The secondary sealing feature 104 may further ensure that no fluid leaks into the cabin of the vehicle 52.

The following description of variants is only illustrative of components, elements, acts, products and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product comprising: a drain grommet comprising; a body portion; wherein the body portion includes a first cylindrical or tubular portion, a second cylindrical or tubular portion, and a third cylindrical or tubular portion; a seal, wherein a seal extends radially from the body portion; and wherein the seal includes a primary sealing feature and a secondary sealing feature.

Variation 2 may include a product as set forth in Variation 1 wherein the body portion further comprises a lip.

Variation 3 may include a product as set forth in Variation 2 wherein the lip is planar.

Variation 4 may include a product as set forth in any of Variations 2-3 wherein the lip extends radially from the body portion.

Variation 5 may include a product as set forth in any of Variations 2-4 wherein the lip includes an upper planar surface and a lower planar surface.

Variation 6 may include a product as set forth in any of Variations 2-5 wherein the upper planar surface extends a distance further than the lower planar surface.

Variation 7 may include a product as set forth in Variation 6 wherein the upper planar surface and the lower planar surface form a 90 degree angle.

Variation 8 may include a product as set forth in any of Variations 2-7 wherein the seal is attached to the lip.

Variation 9 may include a product as set forth in Variation 8 wherein the seal is attached to the lip via overmolding.

Variation 10 may include a product as set forth in any of Variations 1-9 wherein the first cylindrical or tubular portion includes an inner diameter and an outer diameter.

Variation 11 may include a product as set forth in any of Variations 1-10 wherein the outer diameter of the first cylindrical or tubular portion is configured to mate with a hose end.

Variation 12 may include a product as set forth in any of Variations 1-11 wherein an outer surface of the first cylindrical or tubular portion adjacent the perimeter is tapered inwards.

Variation 13 may include a product as set forth in any of Variations 1-12 wherein the second cylindrical or tubular portion includes an inner diameter and an outer diameter.

Variation 14 may include a product as set forth in any of Variations 1-13 wherein the inner diameter of the second cylindrical or tubular portion is the same diameter as the inner diameter of the first cylindrical or tubular portion.

Variation 15 may include a product as set forth in any of Variations 1-14 wherein the third cylindrical or tubular portion is spaced a distance from the first cylindrical or tubular portion and the second cylindrical or tubular portion.

Variation 16 may include a product as set forth in any of Variations 1-15 wherein a length of the third cylindrical or tubular portion is longer than a length of the second cylindrical or tubular portion.

Variation 17 may include a product as set forth in any of Variations 1-16 wherein the body portion includes at least one locking feature.

Variation 18 may include a product as set forth in any of Variations 1-17 wherein the at least one locking feature is located on the third cylindrical or tubular portion.

Variation 19 may include a product as set forth in any of Variations 17-18 wherein the locking feature is configured to retain the drain grommet to an opening in a vehicle.

Variation 20 may include a product as set forth in any of Variations 1-19 wherein the third cylindrical or tubular portion includes an inner diameter and an outer diameter.

Variation 21 may include a product as set forth in any of Variations 1-20 wherein the outer diameter is configured to mate with an opening in a vehicle body.

Variation 22 may include a product as set forth in any of Variations 1-21 wherein the outer diameter adjacent the perimeter is tapered inwards.

Variation 23 may include a product as set forth in any of Variations 1-22 wherein the body portion comprises a synthetic or natural polymer.

Variation 24 may include a product as set forth in any of Variations 1-23 wherein the secondary sealing feature is tapered.

Variation 25 may include a product as set forth in any of Variations 1-24 wherein the primary sealing feature and the secondary sealing feature are angled outward.

Variation 26 may include a product as set forth in any of Variations 1-25 wherein the seal comprises an elastomeric material.

Variation 27 may include a product as set forth in any of Variations 1-26 wherein the seal is attached to the body portion via overmolding.

Variation 28 may include a product as set forth in any of Variations 1-27 wherein the drain grommet is attached to a vehicle heating, ventilation, and air conditioning system.

Variation 29 may include a product as set forth in any of Variations 1-28 wherein the drain grommet is attached to a vehicle heating, ventilation, and air conditioning system and a vehicle body.

Variation 30 may include a product including: a drain grommet comprising: a body portion having a passage formed there through; a seal, wherein a seal extends radially from the body portion; and wherein the seal includes a primary sealing feature and a secondary sealing feature.

The above description of variations is merely illustrative in nature and, thus, variations or variants thereof are not to be regarded as a departure from the spirit and scope of the invention.

What is claimed is:

1. A product comprising:
   a drain grommet comprising:
   a body portion having a passage formed there through, wherein the body comprises a first cylindrical or tubular portion and wherein an outer diameter of the first cylindrical or tubular portion is configured to mate with a hose end, and a second cylindrical or tubular portion and wherein an inner diameter of the outlet of the second cylindrical or tubular portion is the same diameter as an inner diameter of the first cylindrical or tubular portion and does not include a duckbill seal;
   and a seal, wherein the seal extends radially from the body portion; and
   wherein the seal includes a primary sealing feature and a secondary sealing feature.

2. The product of claim 1 wherein the body portion further comprises a lip.

3. The product of claim 2 wherein the lip extends radially from the body portion.

4. The product of claim 2 wherein the lip includes an upper planar surface and a lower planar surface.

5. The product of claim 4 wherein the upper planar surface extends a distance further than the lower planar surface.

6. The product of claim 2 wherein the seal is attached to the lip.

7. The product of claim 6 wherein the seal is attached to the lip via overmolding.

8. The product of claim 1 wherein an outer surface of the first cylindrical or tubular portion adjacent the perimeter is tapered inwards.

9. The product of claim 1 wherein the body comprises a third cylindrical or tubular portion and wherein a length of the third cylindrical portion is longer than a length of the second cylindrical or tubular portion.

10. The product of claim 9 wherein an outer surface of the third cylindrical or tubular portion adjacent the perimeter is tapered inwards.

11. The product of claim 1 wherein the body portion includes at least one locking feature.

12. The product of claim 11 wherein the at least one locking feature is located on a third cylindrical or tubular portion.

13. The product of claim 11 wherein the locking feature is configured to retain the drain grommet to an opening in a vehicle.

14. The product of claim 1 wherein the body portion comprises a synthetic or natural polymer.

15. The product of claim 1 wherein secondary sealing feature is tapered.

16. The product of claim 1 wherein the primary sealing feature and the secondary sealing feature are angled outward.

17. The product of claim 1 wherein the seal comprises an elastomeric material.

18. The product of claim 1 wherein the drain grommet is attached to a vehicle heating, ventilation, and air conditioning system in a vehicle body.

* * * * *